(12) United States Patent
Liu et al.

(10) Patent No.: US 7,754,006 B2
(45) Date of Patent: Jul. 13, 2010

(54) PROCESS FOR MANUFACTURING READY-MIXED SETTING ALPHA-CALCIUM SULPHATE HEMI-HYDRATE AND KIT FOR SAME

(75) Inventors: Qingxia Liu, Vernon Hills, IL (US); Kumar Natesaiyer, Grayslake, IL (US); Qiang Yu, Grayslake, IL (US)

(73) Assignee: United States Gypsum Company, Chicago, IL (US)

( * ) Notice: Subject to any disclaimer, the term of this patent is extended or adjusted under 35 U.S.C. 154(b) by 535 days.

(21) Appl. No.: 11/688,644

(22) Filed: Mar. 20, 2007

(65) Prior Publication Data

US 2008/0229981 A1 Sep. 25, 2008

(51) Int. Cl.
 *C04B 11/024* (2006.01)
(52) U.S. Cl. .................. 106/778; 106/735; 106/765; 106/772; 106/785
(58) Field of Classification Search .......... 106/735, 106/765, 772, 778, 785
 See application file for complete search history.

(56) References Cited

U.S. PATENT DOCUMENTS

| | | |
|---|---|---|
| 1,901,051 A | 3/1933 | Randel et al. |
| 2,113,370 A | 4/1938 | Dunn et al. |
| 2,341,426 A | 2/1944 | Dalley |
| 3,305,375 A | 2/1967 | Jakacki |
| 3,337,298 A | 8/1967 | Ruter et al. |
| 3,410,655 A | 11/1968 | Ruter et al. |
| 3,573,947 A | 4/1971 | Kinkade et al. |
| 3,723,146 A | 3/1973 | Lane |
| 3,913,571 A | 10/1975 | Bayer et al. |
| 3,977,890 A | 8/1976 | Jaunarajs et al. |
| 4,234,345 A | 11/1980 | Fassle |
| 4,239,396 A | 12/1980 | Arribau et al. |
| 4,533,528 A | 8/1985 | Zaskalicky |
| 5,015,449 A | 5/1991 | Koslowski |
| 5,015,450 A | 5/1991 | Koslowski |
| 5,164,004 A | 11/1992 | Kurty |
| 5,683,635 A | 11/1997 | Sucech et al. |
| 5,746,822 A | 5/1998 | Espinoza et al. |
| 6,228,163 B1 | 5/2001 | Espinoza et al. |
| 6,342,284 B1 | 1/2002 | Yu et al. |
| 6,409,824 B1 | 6/2002 | Veeramasuneni et al. |
| 6,409,825 B1 | 6/2002 | Yu et al. |
| 6,416,695 B1 | 7/2002 | Miller |
| 6,652,825 B2 | 11/2003 | Sethuraman et al. |
| 6,805,741 B1 | 10/2004 | Liu et al. |
| 2003/0138616 A1* | 7/2003 | Englert ............ 428/292.4 |
| 2004/0182286 A1 | 9/2004 | Cox et al. |
| 2004/0187741 A1 | 9/2004 | Liu et al. |
| 2005/0235882 A1 | 10/2005 | Lettkeman et al. |

OTHER PUBLICATIONS

International Search Report and Written Opinion dated Jul. 28, 2008 of the corresponding application PCT/US08/57368.

* cited by examiner

*Primary Examiner*—Elizabeth D Wood
(74) *Attorney, Agent, or Firm*—Novak Druce + Quigg LLP

(57) ABSTRACT

A process for making calcined gypsum in slurry or powder form. The process includes adding at least two types of crystal modifiers to the slurry. The first crystal modifier is to control crystal morphology of the calcined gypsum (such as succinic and/or malic acid). The second crystal modifier is to prevent or retard setting to control set time (such as tetrasodium pyrophosphate (TSPP)) to form a water stable product. An accelerator is typically added at the site of use for specific applications such as setting type joint compound, media casting, exterior/interior coating, and sprayable fireproofing. A composition made by the process and a kit for using the composition are also disclosed.

19 Claims, 6 Drawing Sheets

PROCESS FOR MANUFACTURING READY-MIXED SETTING ALPHA-CALCIUM SULPHATE HEMI-HYDRATE AND KIT FOR SAME

FIELD OF THE INVENTION

A new process is disclosed for manufacturing ready-mixed setting alpha-calcium sulfate hemi-hydrate (also known as alpha-hemihydrate). The process includes the use of at least two crystal modifiers, one to control the crystal morphology of alpha-calcium sulfate hemi-hydrate, the other to control the set time. A composition made by the process and a kit for using the composition are also disclosed.

BACKGROUND OF THE INVENTION

Set gypsum (calcium sulfate dihydrate) is a well-known material used to make many types of products and included commonly in many types of products.

Land plaster is a type of gypsum which is any mixture containing more than 50% calcium sulfate dihydrate, $CaSO_4.2H_2O$ (by weight) from any source (such as gypsum mineral from ground or unground sources, synthetic gypsum from flu-gas desulfurization process, or other chemical gypsum as by-products of the phosphate/fluoride industry).

Generally, gypsum-containing products are prepared by forming a mixture of calcined gypsum (i.e., calcium sulfate hemihydrate and/or calcium sulfate anhydrite) and water, and, optionally, other components, as desired. The mixture typically is cast into a pre-determined shape or onto the surface of a substrate. The calcined gypsum reacts with the water to form a matrix of crystalline hydrated gypsum, i.e., calcium sulfate dihydrate. It is the desired hydration of calcined gypsum that enables the formation of an interlocking matrix of set gypsum, thereby imparting strength to the gypsum structure in the gypsum-containing product.

U.S. Pat. No. 3,410,655 (Ruter et al.), incorporated herein by reference, teaches a process for producing alpha-calcium sulfate hemihydrate in the form of compact, non-needle-like crystals. The process elutrates calcium sulfate dehydrate with water to remove organic impurities and fine and slurry crystal portions from the calcium sulfate dehydrate at a temperature between 60 and 90 degrees C. This forms an aqueous suspension of the calcium sulfate dihydrate having a pH between about 1.5 and about 6. This also adds tetrapropylenebenzene sulfonate or carboxymethyl cellulose as a crystal form improving agent to the dehydrate suspension. After adding the agent, the process further raises the temperature of the suspension at a rate which increases with the pH of the suspension and maintains the same with close temperature control (plus or minus 1 degree C.) for a period of time to complete formation of an alpha-calcium sulfate hemihydrate.

U.S. Pat. No. 5,746,822 (Espinoza et al.), incorporated herein by reference, discloses producing a cementitious composition of the setting type which can be kept in a ready-mixed state (premixed with water) and which can be caused to set and harden upon introduction of an accelerator. As a component of such cementitious composition is mentioned calcium sulfate hemihydrate as a principle filler material which may contain certain non-calcium bearing phosphate additives which prevent setting action in the presence of water.

U.S. Pat. No. 6,228,163 (Espinoza et al. II) teaches the mixing of a dry α-calcium sulfate hemihydrate with, among other components, TSPP as a set preventer.

U.S. Pat. No. 6,409,825 (Yu et al.), incorporated herein by reference, discloses combining a wet gypsum accelerator with water and calcined gypsum to form an aqueous mixture in which the calcined gypsum is hydrated to form an interlocking matrix of set gypsum.

U.S. Pat. No. 6,805,741 (Liu et al.), incorporated herein by reference, discloses forming a ready-mixed composition or, alternatively a dry composition, which sets when mixed with an activator for the reaction of calcined gypsum and water to form set gypsum. The patent discloses to add a polyacrylic acid and/or a salt thereof as a set preventer.

There is a need for ready-mixed compositions which have lower viscosity and higher strength than ready-mixed joint compounds. For example, in many applications, it would be desirable to have a ready-mixed composition that is flowable before activator is added to the composition, and which remains flowable for some period of time even after activator is added, so that the user has sufficient "workable" time to use the composition for its intended purpose.

Flowable ready-mixed compositions would be desirable for use in a variety of interior and exterior applications. For example, flowable ready-mixed compositions would be useful in a number of plaster applications including dental applications, building plaster, machinable plaster, and the like. Also, dental plaster is useful for casting dimensionally accurate reproductions of a portion of an oral cavity or extraoral facial structure as a positive impression formed from a polymer such as alginate that forms a negative impression. In addition, building plaster may be in the form of, for example, veneer plaster (e.g., DIAMOND® brand interior finish plaster, commercially available from the United States Gypsum Company) for finishing interior wallboards.

Also, flowable ready-mixed compositions have use in forming molds made of plaster for casting pottery figurines and the like using pressure casting or slip casting techniques known in the art. Also, ready-mixed flowable compositions would be useful for solid casting applications, such as, for example, statuary and architectural pieces such as moldings, and rotational casting applications. For example, rotational casting is used to form hollow products, such as, for example, lamp posts and the like. Also, flowable ready-mixed compositions would be useful in spray applications, including glass fiber reinforced gypsum compositions for making decorative architectural pieces.

Thus, there is a need for ready-mixed, setting-type compositions having a relatively low viscosity to be flowable, and preferably remaining flowable for a time even after activator is added. Also, there is a need for such a ready-mixed composition in which setting is avoided in the absence of activator for a relatively long time such that the composition has a long shelf-life. Furthermore, there is a need for a ready-mixed composition in which the solid particulate in the composition does not settle and where water does not bleed.

SUMMARY OF THE INVENTION

It is an object of the invention to provide a process for making a ready-mixed slurry composition or a powder composition comprising calcium sulfate alpha hemihydrate.

The final product can be wet or dry form, depending on the use. Preparing the wet slurry form is energy efficient because removal of water is unnecessary. The dry form is typically easier to ship.

If the composition is provided as a slurry, then the slurry and a setting acceleration catalyst could be provided separately packaged as part of a kit. When ready for use, the catalyst could be added to the slurry to set the composition. The catalyst would set the wet composition.

If the composition is provided in dry form, then the dry composition and setting acceleration catalyst could be provided separately packaged as part of a kit. When ready for use the dry form could be mixed with water and then catalyst to form a slurry. The dry form would not set merely by being mixed with water.

The invention adds at least two crystal modifiers at selected times and amounts to produce a stable ready-mixed slurry having a desired particle size distribution and a long shelf life, e.g., 3 to 6 months, without setting. The particle size is either achieved in situ by the reaction conditions and ingredients or can be achieved by wet grinding the produced slurry particles.

In the process, slurry comprising gypsum (calcium sulphate dihydrate) and water is fed to a reactor. In the reactor the gypsum is calcined to form a product comprising calcium sulfate alpha hemihydrate. The process employs at least two crystal modifiers. The first crystal modifier is added to the slurry in the reactor. The first crystal modifier controls the crystal morphology of the calcium sulfate alpha hemihydrate. The role of the first crystal modifier is to control the crystal morphology in the reactor to make alpha-hemihydrate with a desired particle size, e.g., 50 to 20 microns ($d_{50}$) average particle size.

A typical first crystal modifier is succinic acid.

The second crystal modifier is added either to the slurry in the reactor (after the formation of the desired alpha-calcium sulfate hemihydrate) or to the slurry downstream of the reactor. This second modifier, also known as a set retarder or set preventer, controls the set time of the calcined gypsum. An example of the second modifier is tetrasodium pyrophosphate (TSPP), citric acid or a mixture of TSPP and citric acid. Thus, both the first and second crystal modifiers are added prior to the optional drying of the slurry. Thus, the calcined slurry retains, some, typically at least a majority, of the water from the slurry from the reactor when the second crystal modifier is added.

The retarded slurry can optionally be ground, e.g., wet ground while still slurry in the presence of set retarders, to a desired particle size for further formulation. Preferably the process provides the composition as a ready-mixed slurry composition and avoids the steps of filtration, drying, grinding, grading, and packaging prior to remixing with water.

However if desired, the slurry can be dried to form a dry product.

The formulated calcined gypsum slurry and/or powder is retarded to have a long shelf life, for example, 3 to 12 months or 3 to 6 months. Preferably the shelf life is more than one year. However, activator is added with water to the ready-mixed composition when it is desired to initiate setting of the calcined gypsum to an interlocking matrix of set gypsum, typically at a job site, just prior to use, for specific uses such as setting type joint compound, media casting, exterior/interior coating and sprayable fireproofing. Thus, preferably, a kit in accordance with the present invention comprises a ready-mixed composition packaged separately from the activator.

These and other objects and advantages of the invention are to reduce cost in the prior art processing including, but not limited to, the elimination of the filtration and drying steps in making alpha-hemihydrate.

In its composition aspects, the invention provides a ready-mixed composition that sets when mixed with an activator for the reaction of calcined gypsum with water to form set gypsum. The composition comprises water and calcined gypsum in a weight ratio of water to calcined gypsum of from about 0.15 to about 0.5.

The composition also comprises the above mentioned at least two crystal modifiers.

The composition has a viscosity of from about 5,000 centipoises to about 48,000 centipoises. The ready-mixed composition of the present invention has a long shelf-life and will set after the mixing of activator therewith. In some embodiments, the ready-mixed composition exhibits sufficient flowability even after mixture with an activator to permit the activated composition to be applied and formed to a desired shape.

The calcined gypsum comprises calcium sulfate alpha hemihydrate. However, calcium sulfate beta hemihydrate or calcium sulfate anhydrite, and combinations thereof may also be present in amounts of less than 5% each.

One or more additional components, such as, for example, plasticizer, chelating agent, pH modifier, defoamer, foaming agent, reinforcing polymer, anti-freeze agent, suspension aid, bactericide, fungicide, and/or thickener can be added to the ready-mixed composition of the invention, as desired.

The present invention also provides a kit comprising separately packaged components. One of the components is a composition comprising calcined gypsum and the at least two crystal modifiers, and, optionally, water. Another component comprises an activator which, when mixed with the composition, allows the composition to set.

DETAILED DESCRIPTION OF THE PREFERRED EMBODIMENTS

Figure 1:
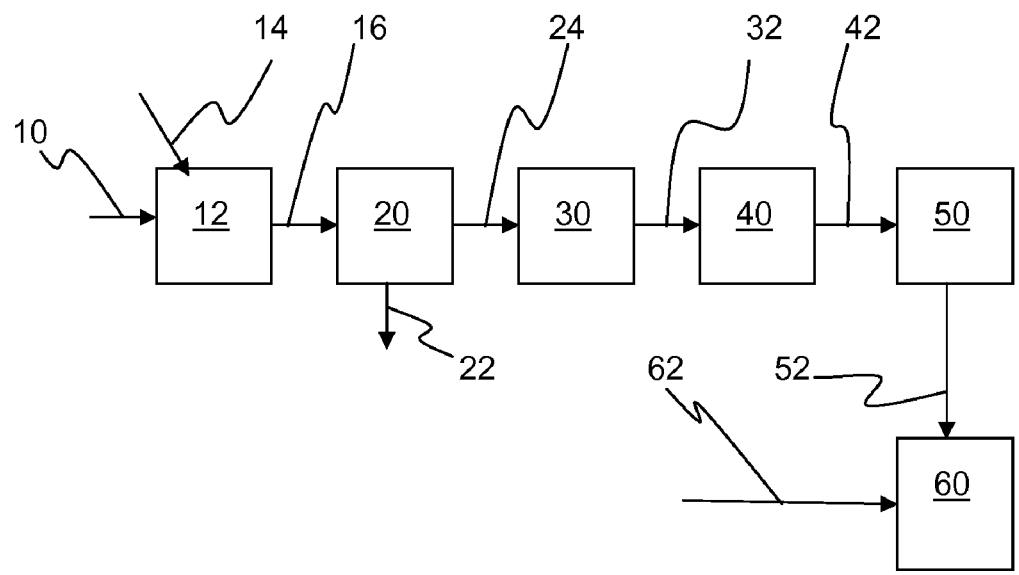
FIG. 1 is a schematic representation of the prior art.

FIG. 1 shows an embodiment of the prior art in which a slurry comprising gypsum (calcium sulfate dihydrate) 10 and water is fed to a jacketed reactor 12. The slurry is held in the reactor 12 at conditions for calcining the gypsum to convert it to a form of calcined gypsum comprising alpha-calcium sulfate hemihydrate. The feed may be any form of gypsum, such as landplaster, gypsum mineral from ground or unground sources, synthetic gypsum from flu-gas desulfurization process, or other chemical gypsum as by-products of the phosphate/fluoride industry. A first crystal modifier 14 is also fed to the reactor. Typically at least 80% of the gypsum is converted by calcination to alpha calcium sulfate hemihydrate, alpha-$CaSO_4.0.5H_2O$. For purposes of this description a calcined gypsum product has at least 80% of its gypsum in the form of calcium sulfate hemihydrate, $CaSO_4.0.5H_2O$.

The calcined gypsum product 16 discharges from the reactor 12 as a slurry comprising alpha-calcium sulfate hemihydrate and feeds a filtration unit 20 to remove water 22 and produce a product 24. Product 24 then feeds a drying unit 30 which makes a dry product 32. The dried product 32 is fed to a grinding and PST unit 40 to make a dry product 42 comprising alpha-calcium sulfate hemihydrate of desired particle size which is then sent to a packaging unit 50 to make a packaged product 52.

Water 62 is added to the product 52 at the site where the product 52 will be used when it is desired to use the product 52. For example, set gypsum-containing products are prepared by forming a mixture comprising calcined gypsum (calcium sulfate hemihydrate, $CaSO_4.0.5H_2O$ in the alpha form), and/or calcium sulfate anhydrate, ($CaSO_4$) and water (and impurities or other components, as appropriately added), casting the mixture into a desired shaped mold or onto a surface, and allowing the mixture to harden to form set (i.e., rehydrated) gypsum by reaction of the calcined gypsum with water to form an interlocking matrix of crystalline hydrated gypsum (calcium sulfate dihydrate, $CaSO_4.2H_2O$). This is often followed by mild heating to drive off the remaining free (unreacted) water to yield a dry product.

An Embodiment of a Process of the Present Invention

Figure 2:
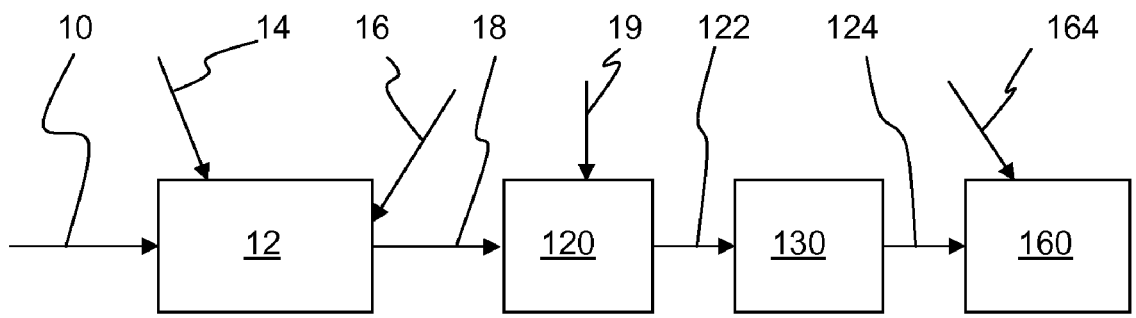
FIG. 2 is a schematic representation of the invention for making alpha-hemihydrate slurry.

FIG. 2 shows an embodiment of the process of the invention in which a slurry comprising gypsum (calcium sulfate dihydrate) 10 and water was fed to a jacketed reactor 12 and mixed with additional water as needed.

A first crystal modifier 14 is added to the reactor 12. Typically 2 to 10 pounds per ton of the gypsum modifier are added. Although succinic acid is further described as a preferred embodiment of a first crystal modifier, it should be understood that other crystal modifiers, such as maleic acid, may be used, alone or in combination, in the invention without departing from the spirit and scope thereof. The first crystal modifier 14 controls the crystal morphology of the calcium sulfate alpha hemihydrate to achieve a desired particle size, e.g., 50 to 20 microns ($d_{50}$) average particle size.

Together with the succinic acid, potassium sulfate may also added to the slurry in the reactor 12 (as shown in FIG. 2), or added after the reactor 12 (not shown). The potassium sulfate controls the hydration rate and setting expansion of alpha-hemi-hydrate.

The slurry is held in the reactor 12 and the reactor 12 is heated to a temperature of from 120 to 300 degrees F. and a pressure of about 15 to 50 psi (1.03 to 3.10 bar) and maintained at these conditions for about 15 to 45 minutes to calcine the gypsum.

For example, in a typical embodiment, after the reactor 12 is closed, hot steam is delivered to the jacket around the reactor 12 to heat the reactor 12 for about thirty five minutes. The change in temperature and pressure inside the reactor are monitored as a function of time. Then after about forty five minutes, the delivery pressure of the steam was increased to bring the reaction to completion in about fifteen additional minutes. The first crystal modifier could, for example, be added to the slurry before heating begins or while the slurry is being heated or maintained at a desired temperature.

After reaction is finished, the calcined slurry 18 is discharged. Typically there are 50-65 weight percent solids in the calcined slurry 18 discharged from the reactor 12. At least one second crystal modifier or retarder is added, as a set retarder or set preventer, to the hot slurry in the reactor 12 (after the desired calcination is essentially completed) or downstream of the reactor 12 (e.g., in a downstream thermal tank, not shown, which acts as a holding tank). Typically about 5 to 20 pounds of second crystal modifier are added per ton of calcium hemihydrate.

The slurry 18 passes to a mixing unit 120 with optional grinding. Additional additives 19 are typically added to the mixing unit 120. A mixed stream 122 then discharges from the mixing unit 120 and passes to a packaging station 130 which packages the material of the mixed stream 122 to produce packages of stable ready mix slurry product 124.

When it is desired to use the ready mix product 124, then the product 124 is combined with accelerator 164 at the site of use 160.

First and Second Crystal Modifiers

TABLE 1 presents typical first and second crystal modifiers

TABLE 1

| First Crystal Modifiers | Second Crystal Modifiers | |
|---|---|---|
| | Set Retarder | Set Preventer |
| Maleic Acid | Citric acid | Polyacrylic acid |
| Succinic acid | Tartaric Acid | Tetra-sodium pyrophosphate |
| Lactic acid | Polyacrylic acid | organic polyphosphonic compound, e.g., DEQUEST 2006 (penta-sodium salt of amino trimethylene phosphonic acid) |
| Citric acid | Aspartic acid | Citric acid |
| Tartaric acid | Monosodium gluconate | |
| Monosodium gluconate | Tri-polyphosphate | |
| Ethylene diamine tetra-acetic acid or sodium salt thereof | Gelatin | |
| Aspartic acid | DEQUEST 2006 (penta-sodium salt of amino trimethylene phosphonic acid) Ethylene diamine tetra-acetic acid or sodium salt thereof Diethylene triamine penta-acetic acid Sodium polyacrylate | |

In some instances a single set preventer or set retarder can be the second crystal modifier depending upon the desired shelf life.

In some instances the same additive, e.g., citric acid can be employed as the first crystal modifier and the second crystal modifier. However, in this instance a first amount of the additive is added to the reactor to act as a first crystal modifier and after sufficient calcination a second amount of the additive is added. To add both amounts of the additive before calcination would interfere with formation of desired calcined particles.

Optionally, the set preventer for the ready-mixed composition of the invention may include an organic polyphosphonic compound or a mixture of organic polyphosphonic compounds. However, the use of only one or more organic phosphonic compounds would not be sufficient as a set preventer, so an additional set preventer would be included.

Any suitable organic polyphosphonic compound may be included, if desired. Typical suitable organic polyphosphonic compound are described in U.S. Pat. No. 6,409,824, incorporated herein by reference.

For example, the organic polyphosphonic compound may be selected from amino tri(methylene-phosphonic acid), amino tri(methylene-phosphonic acid)pentasodium salt, 1-hydroxyethylidene-1,1-diphosphonic acid, 1-hydroxyethylidene-1,1-diphosphonic acid tetrasodium salt, diethylenetriamine penta(methylene phosphonic acid)pentasodium salt, diethylenetriamine penta(methylene phosphonic acid) trisodium salt, hexamethylene diamine tetra(methylene phosphonic acid), hexamethylene diamine tetra(methylene phosphonic acid)potassium salt, and combinations thereof. The organic polyphosphonic compound or mixture of organic polyphosphonic compounds is present in any suitable amount sufficient to provide the desired set prevention, such as for example, an amount of from about 0.1% to about 0.5% by weight of the composition.

Typical suitable organic polyacrylic compounds are described in U.S. Pat. No. 6,805,741, incorporated herein by reference.

In accordance with the present invention, in the absence of activator, the ready-mixed composition does not set over extended periods of time. Thus, it has a long shelf-life. In this respect, the ready-mixed composition preferably does not set for at least about 60 days without addition of activator, more preferably, at least about 90 days, even more preferably, at least about 175 days, still more preferably at least about 1 year.

In preferred embodiments, the weight ratio of water to calcined gypsum in the ready-mixed composition is from about 0.15 to about 0.5, preferably, from about 0.2 to about 0.35, and even more preferably, from about 0.2 to about 0.25. In achieving the desired weight ratios of water to calcined gypsum, the calcined gypsum preferably is present in an amount of from about 50% to about 80% by weight of the composition, more preferably, in an amount of from about 65% to about 75% by weight of the composition. The water preferably is present in an amount of from about 15% to about 30% by weight of the composition, more preferably, in an amount of from about 20% to about 25% by weight of the composition.

The weight ratios of water to calcined gypsum as described are particularly desirable because they enhance the compressive strength and density of the set composition after activator is added and the interlocking matrix of set gypsum is formed. In this respect, in preferred embodiments, after activator is added and the composition is set, the product has a compressive strength of at least about 1,000 psi (68.95 bar), more preferably, at least about 1,200 psi (82.74 bar), even more preferably, at least about 1,500 psi (103.4 bar), still more preferably, at least about 2,500 psi (172.4 bar), and even more preferably, at least about 3,000 psi. (206.8 bar) In some embodiments, the compressive strength of the product can be about 7,000 psi (482.6 bar) or even higher. The density of the composition after setting preferably is at least about 90 lb/ft$^3$ (1.44 gm/cm$^3$), e.g., from about 90 to about 130 lb/ft$^3$ (1.44 to 2.08 gm/cm$^3$), more preferably, from about 100 to about 130 lb/ft$^3$ (1.60 to 2.08 gm/cm$^3$), even more preferably, from about 102 to about 110 lb/ft$^3$ (1.63 to 1.76 gm/cm$^3$).

In accordance with the present invention, the ready-mixed composition of the invention exhibits a relatively low viscosity such that it is suitably flowable. By flowable, it is meant that the composition can be poured into a mold or sprayed using a spraying machine. Such flow characteristics are achieved when the composition has a viscosity in a range of from about 5,000 centipoise to about 48,000 centipoise, more preferably, from about 5,500 centipoise to about 45,000 centipoise, and even more preferably from about 5,500 centipoise to about 40,000 centipoise.

In preferred embodiments, after activator is added to the composition, it remains flowable. For example, in some embodiments, the composition remains flowable for at least about 0.25 hours after activator is added, more preferably, the composition is flowable for a period of time of from about 0.25 hours to about 6 hours after activator is added, even more preferably, the composition is flowable for a period of time of from about 0.25 hours to about 3 hours after activator is added, and still more preferably, the composition is flowable for a period of time of from about 0.25 hours to about 1.5 hours after activator is added.

Ready-mixed compositions having the preferred viscosities according to the present invention, and which preferably are flowable before and after addition of activator, are suitable for use in any of a number of different interior or exterior applications, such as, for example, plaster, spray formulations, solid casting, rotational casting, hand lay-up formulations, and the like. Examples of plaster applications include dental plaster, building plaster, veneer plaster, machinable plaster, and the like. Spray applications include, for example, large scale model making and the like. Exemplary solid casting applications include statuary, architectural moldings, and the like. Examples of rotational casting applications include hollow articles such as lamp posts and the like. Different viscosities within the preferred ranges described herein may be suitable for different applications, as will be appreciated by one of ordinary skill in the art. For example, hand lay-up compositions preferably have a viscosity on the higher end of the preferred range to permit their application by hand (e.g., on a horizontal or vertical surface), typically in alternating layers with glass fiber to form a laminated composite.

Other Additives

Despite the relatively low weight ratio of water to calcined gypsum used in achieving the interlocking matrix of set gypsum of desirable compressive strength and density, the inventive ready-mixed composition can be formulated to achieve the desired flowability and low viscosity even though the polyacrylic acid and/or salt thereof coats the calcined gypsum particles to form a chemical barrier between the calcined gypsum surface and water, thereby preventing formation of calcium sulfate dihydrate crystals. In this respect, it is surprising that the flow of the composition can be enhanced even where the inorganic gypsum particles are coated with the organic set prevention agent according to the invention. Even though nucleation sites on the gypsum crystals are occupied by the set preventer of the invention, the desired viscosity and flowability, for example, through the use of plasticizer as discussed herein below, can be achieved.

When initiation of setting is desired, typically by a user at a job-site, activator (accelerator) is added. As such, activator is packaged separately from the ready-mixed composition in a preferred kit embodiment according to the invention. It is believed that the activator acts to detach the preventer from the calcined gypsum crystals so that water can react with the calcined gypsum and setting can take place. As will be appreciated by one of ordinary skill in the art, the type of activator that is selected can vary depending upon the desired setting time. In some embodiments, a short setting time, for example from about 1 minute to about 10 minutes, is desirable, such as with spray formulations. However, in many other applications, a longer setting time, for example, from about 10 minutes to about 360 minutes, is desired so that the composition after activator is added provides sufficient workable time for the user, as would be typically useful in some applications, such as solid casting, rotational casting, hand lay-up, and the like.

Thus, in some embodiments, activators are selected that provide a short setting time. Examples of such activators include, but are not limited to, aluminum sulfate, zinc sulphate, sulfuric acid, hydrochloric acid, sodium hydrogen sulfate, potassium hydrogen sulfate, potassium aluminum sulfate, calcium sulfate dihydrate, and the like, or combinations thereof. For example, U.S. Pat. No. 6,409,825 to Yu et al. discloses a wet gypsum accelerator comprising particles of calcium sulfate dihydrate, water, and at least one additive selected from the group consisting of (i) an organic phosphonic compound, (ii) a phosphate-containing compound, or (iii) a mixture of (i) and (ii). Another example of an activator (accelerator) is a set accelerator powder comprising fine ground particles of calcium sulfate dihydrate coated with sugar to maintain efficiency and heated as described in U.S. Pat. No. 3,573,947 (the disclosure of which is hereby incorporated by reference), herein referred to as a "climate stabilized accelerator" (CSA). However, in many applications, zinc sulfate is a preferred activator because its rate of overcoming the set preventer is very slow but can be increased by additional additives including, for example, a chelating agent such as an amine chelating agent. Thus, the rate of setting can be controlled with the selection of a zinc sulfate activator. The more chelating agent that is added, the shorter the resultant setting time. Accordingly, the use of a zinc sulfate activator in conjunction with an additive such as an amine chelating agent can accommodate longer working times, if desired.

The activator is added in any amount sufficient to achieve setting of the ready-mixed composition upon addition thereto in a desired amount of time. For example, the activator can be provided in an amount of from about 0.5% to about 6% by weight of the ready-mixed composition, more preferably, in an amount of from about 3% to about 5% by weight of the ready-mixed composition. In preferred embodiments, the activator is provided in aqueous solution. For example, the activator can be included in the aqueous solution in an amount of from about 5% to about 50% by weight of the solution, more preferably, in an amount of from about 10% to about 33% by weight of the solution.

Chelating agent optionally can be included in some embodiments. For example, in embodiments where zinc sulfate is selected as the activator, chelating agent preferably is added to the activator and/or to the ready-mixed composition, to help control the setting time. In this respect, activator comprising zinc sulfate can be tailored to achieve setting in any amount of time from about 5 minutes to about 360 minutes in accordance with preferred embodiments of the present invention. It has been found that adjusting the pH of the ready-mixed composition may further control the setting time.

The chelating agent preferably is provided in any suitable amount, such as, for example, in an amount of from about 0.1% to about 0.5% by weight of the ready-mixed composition. Preferably, the weight ratio of set preventer to chelating agent is from about 1.2:1 to about 6:1, preferably, 2:1 to about 6:1.

The chelating agent can be in any suitable form. Examples of suitable chelating agents include, for example, ammonium hydroxide, triethanolamine, 2-amino-2-methyl-1-propanol, and the like, and combinations thereof. Amine chelating agents are particularly desirable because they contain amino groups, which are basic and thus will participate in acid-base reactions with acidic carboxyl groups on the polyacrylic acid and/or salt thereof, thereby assisting the zinc sulfate in detaching the set preventer from the calcined gypsum crystals, and thus controlling setting time. Preferred amine chelating agents also chelate with divalent or trivalent metal ions in the ready-mixed composition, such as iron ions that might be present as an impurity, thereby inhibiting coagulation and flocculation of particles and thus providing some enhancement of fluidity. However, in some embodiments where it is necessary to significantly increase fluidity to achieve the desired viscosity as set forth herein, a plasticizer will also be required. It is believed that the chelating agent functions by speeding up the action of the activator by complexing with the set preventer so that the set preventer is inhibited from attaching to the calcined gypsum crystals.

A preferred amine chelating agent is 2-amino-2-methyl-1-propanol, such as AMP 95, commercially available from Dow Chemical Company, because it also acts as a pH modifier. In this respect, preferably, the pH of the ready-mixed composition of the invention is from about 5.5 to about 10, more preferably, from about 8 to about 9, especially where a zinc sulfate activator is used. In this respect, it has been found that shorter setting times are achieved at the upper end of the preferred pH range while longer setting times are achieved at the lower end of the desired pH range.

The ready-mixed composition of the invention can be used in both interior and exterior applications. One or more additives can be added to the ready-mixed composition to facilitate the desired viscosity, and other optional additives may be added to achieve desired physical characteristics in the final set product, such as, for example, flexural strength, abuse resistance (e.g., chip resistance), water resistance, flame resistance, and the like, or combinations thereof.

The desired viscosity can be achieved, for example, by including one or more plasticizers in the ready-mixed composition. Plasticizers that are suitable for use in gypsum slurries are well known in the art and any can be selected so long as they do not adversely affect any of the other ingredients in the composition, as would be appreciated by one of ordinary skill in the art. Preferably, plasticizer is provided to enhance fluidity and thus inhibits particle flocculation and allows for a reduction in the water demand of the ready-mixed composition while still achieving a desired fluidity and viscosity. The plasticizer, particularly in combination with a reinforcing polymer such as a latex as described herein below, preferably also increases flexibility and abuse resistance, particularly chip resistance, of the final product.

An example of desirable plasticizer is a polyether polycarboxylic compound or salt thereof, and the like, or blends or copolymers thereof, such as, for example, polyether polycarboxylate, sodium salt. Commercial examples of desirable plasticizer include, but are not limited to, ETHACRYL 6-3070, which is a polyether polycarboxylate, sodium salt commercially available from Lyondell Chemical Company, Newtown Square, Pa., as well as MELFLUX materials, which are commercially available from Degussa. More than one plasticizer may be employed in accordance with the present invention, as will be appreciated by one of ordinary skill in the art. It is noteworthy that naphthalene sulfonates and melamine formaldehyde resin plasticizers are less preferred plasticizers because they do not sufficiently enhance fluidity when used alone. In some embodiments, the ready-mixed composition is substantially free of naphthalene sulfonates and melamine formaldehyde resin plasticizers such that the desired viscosity according to the invention is achieved in their absence.

The plasticizer is present in any amount suitable for achieving a desired viscosity, such as, for example, an amount of from about 0.2% to about 0.8% by weight of the ready-mixed composition, preferably an amount of from about 0.4% to about 0.7% by weight of the ready-mixed composition.

Optionally, if desired, wetting agent, suspension aid, and/or thickener can be included in the composition. Wetting agents, suspension aids, and thickeners that are suitable for use in gypsum slurries are well known in the art and any can be selected so long as they do not adversely affect any of the other ingredients in the composition, as would be appreciated by one of ordinary skill in the art. Wetting agents enhance wettability of the ready-mixed composition by reducing surface tension such that the solid particles can be wet, while also enhancing the ability of the ready-mixed composition to be applied on a substrate surface. For example, the wetting agent can be in the form of nonyl phenol ethoxylate, commercially available as VANWET 9N9 by Van Waters and Rogers Company, and/or di-2-ethylhexyl sulphosuccinate, sodium salt, commercially available as HYDROPALAT 875 (also referred to as NOPCOSANT-L) from Cognis Corporation. The wetting agent may be present in any amount sufficient to enhance fluidity. For example, the wetting agent can be present in an amount of from about 0.1% to about 1% by weight of the ready-mixed composition, preferably, in an amount of from about 0.2% to about 0.5% by weight of the ready-mixed composition.

An example of a suspension aid suitable for use in the composition of the present invention is a xanthum gum, such as KELTRO C 617, commercially available from CPKelco Co. The suspension aid is present in an amount sufficient to inhibit settling of particulate and bleeding of water. For example, the suspension aid can be present in an amount of from about 0.01% to about 0.2% by weight of the ready-mixed composition, preferably, in an amount of from about 0.02% to about 0.1% by weight of the ready-mixed composition.

In some embodiments, thickener can optionally be added to raise viscosity of the suspension, if desired. The thickener can be provided in the ready-mixed composition directly in some embodiments, but can also be separately packaged from the ready-mixed composition. By illustration, the thickener can be included with the activator in a second package or it can be added in a third package separate from both the ready-mixed composition and the activator. Thickener provided in a separate package may be desirable in some embodiments where the user wishes to adjust the viscosity on-site, as desired. Inclusion of alkaline swellable thickener directly in the ready-mixed composition is particularly desirable at higher pH, for example, a pH of 7 or higher, to enhance suspension.

Examples of thickeners suitable for use in gypsum compositions are well known in the art. For example, any of ALCO GUMS SL-117, L511, and L520, which are acrylic and amine type copolymers commercially available from National Starch and Chemical Company, Bridgewater, N.J., can be used as thickening agents. ALCO GUMS SL-117 is particularly desirable in embodiments where thickener is included directly in the ready-mixed composition, while ALCO GUMS L511 and L520 can be used in embodiments comprising separate packaging. If present, the thickener is included in the ready-mixed composition in an amount sufficient to achieve a desired suspension viscosity. For example, in some embodiments, the thickener is present in an amount of from about 0.2% by weight to about 5% by weight of the ready-mixed composition, more preferably, in an amount of from about 0.5% by weight to about 2% by weight of the ready-mixed composition.

Defoamer optionally may be added. For example, defoamer may be used to minimize air bubble formation during applications where the composition is subject to strong agitation as in the case where the composition, either before or after addition of activator, is poured into a mold such as in solid casting or rotational casting applications. The entrapped air bubbles are undesirable in most embodiments because they may cause formation of air voids in the final product, which would compromise the strength and appearance of the final product. In applications where the composition is not as susceptible to air bubble formation, such as spray applications, defoamer can be excluded from the composition. Defoamers for use in gypsum slurries are well known in the art. By way of example, the defoamer can be in the form of DeeFo 542, commercially available from Ultra Additives, Inc., Paterson, N.J. DeeFo 542 is a mixture comprising petroleum distillates, synthetic wax, the reaction product of silicon dioxide and an organosiloxane copolymer, as well as solvent-refined heavy and light paraffins. The defoamer can be present in any amount sufficient for inhibiting bubble formation. For example, the defoamer can be present in an amount of from about 0.1% to about 1% by weight of the ready-mixed composition, preferably, in an amount of from about 0.2% to about 0.4% by weight of the ready-mixed composition.

On the other hand, if desired, foaming agent can be included optionally, especially in embodiments where decreased strength is not a concern and where a lower density product is desired. The use of foaming agents in gypsum slurries is well known in the art, such as described in, for example, U.S. Pat. Nos. 5,683,635 and 6,342,284. For example, if present, the foaming agent can be present in an amount of from about 0.1% to about 1% by weight of the ready-mixed composition, preferably, in an amount of from about 0.2% to about 0.4% by weight of the ready-mixed composition.

In some embodiments, reinforcing polymer is included in the ready-mixed composition of the invention to enhance water resistance, abuse resistance, and/or flexural strength where one or more of these characteristics is desirable. Reinforcing polymers useful for gypsum compositions are well known in the art. Any type of reinforcing polymer can be used so long as it does not adversely impact any of the other ingredients in the ready-mixed compositions of the invention, as would be appreciated by one of ordinary skill in the art. By way of example, the reinforcing polymer can be in the form of an acrylic latex, which includes polyacrylic acid latexes. Polyacrylic acid latexes can be unsubstituted or substituted, wherein substitutions include, for example, an alkyl such as methyl, ethyl, and the like. Salts of polyacrylic acids are also useful, as well as blends or co-polymers of any of the foregoing. A commercial example of a desirable reinforcing polymer in accordance with some embodiments of the invention is VF-812 latex (also identified as FORTON polymer), which is a methacrylic type of water based latex, commercially available from Engineered Polymer Solutions, Marengo, Ill. As will be appreciated by one of ordinary skill in the art, other suitable reinforcing polymers include, for example, polyurethanes, poly-styrene butadienes, polyvinyl acetates, and the like, or blends or copolymers of any of these. While such reinforcing polymers are particularly desirable to include in ready-mixed compositions for exterior or interior applications that benefit from enhanced water resistance, it is also desirable to include such polymers in ready-mixed composition for use in some interior or exterior applications where the reinforcing polymer's enhancement of abuse resistance (e.g., chip resistance) and/or flexural strength is beneficial.

If included, the reinforcing polymer preferably is present in any amount sufficient to enhance water resistance, abuse resistance, and/or flexural strength. In exterior applications, for example, the reinforcing polymer can be present in an amount of from about 30% to about 35% by weight of the ready-mixed composition. In indoor applications, lower amounts of the reinforcing polymer are desirable in embodiments where flammability is a concern. In this respect, because the reinforcing polymer may adversely increase flame spread when used in high amounts, the reinforcing polymer preferably is present in an amount of 24% or less by weight of the ready-mixed composition in applications where flame spread is a concern.

Optionally, in some embodiments, an anti-freeze agent can be provided to reduce the freezing point of the composition and to enhance freeze-thaw stability. Any suitable anti-freeze agent may be used. Suitable anti-freeze agents for aqueous systems are well known, such as, for example, glycol derivatives such as ethylene glycol and propylene glycol, as well as methoxypropanol, chloride salts such as sodium chloride and magnesium chloride, and the like, or combinations of any of the foregoing. If present, the anti-freeze agent preferably is included in an amount sufficient to reduce the freezing temperature to a desired point and/or to enhance freeze-thaw stability. For example, in some embodiments, the anti-freeze agent is present in an amount of from about 0.1% to about 0.9% by weight of the ready-mixed composition, preferably, in an amount of from about 0.2% to about 0.8% by weight of the ready-mixed composition.

In some embodiments, a biocide such as fungicide and/or bactericide optionally may be included in the ready-mixed composition of the invention. Examples of suitable fungicides and biocides are well known in the art. By way of example, TROYSAN 174, commercially available from Troy Chemical Company, may be selected as a bactericide, while a tributyltin benzoate solution such as FUNGITROL 158, commercially available from Fritz Chemical Company, may be selected as a fungicide. If present, the bactericide and/or fungicide preferably are present in an amount sufficient to inhibit growth of bacteria or fungi in the ready-mixed composition. For example, if included, each of the bactericide and fungicide is present in an amount of from about 0.01% to about 0.1% by weight of the ready-mixed composition, preferably, in an amount of from about 0.03% to about 0.1% by weight of the ready-mixed composition.

It is to be noted that ready-mixed compositions according to the invention preferably are packaged so that the ready-mixed composition does not come into direct contact with a metal container, which could otherwise corrode when in contact with the aqueous ready-mixed composition. Thus, in embodiments where a metal container such as steel is used, it is beneficial to line the metal, for example with an epoxy coated liner or other plastic that does not adversely interact with the ready-mixed composition.

The following examples further illustrate the present invention but should not be construed as in any way limiting its scope. The weight percentages are by weight of the composition, unless otherwise indicated.

EXAMPLES

Example 1

In a CHEMINEER reactor, 5 pounds (2.3 kg) of land plaster was mixed with 11 pounds (5.0 kg) of water. Then, 4.5 g succinic acid and 22.7 g potassium sulphate was added to the slurry. After the reactor was closed, hot steam was delivered to the jacket around the reactor at 35 psi delivery pressure to heat up the land plaster slurry in the reactor for thirty five minutes. The change of the slurry temperature and pressure inside the reactor was monitored as a function of time. After forty five minutes, the delivery pressure of the hot steam was increased to 45 psi (3.10 bar) and the reaction was continued for another fifteen minutes. After the reaction was finished, slurry was discharged to two buckets and then different retarders, such as TSPP and/or citric acid (1 wt % total), was added to a respective hot slurry. All the examples employed 1 wt. % total set retarder.

The slurry was saved and the combined water was monitored as function of time.

For the grinding test, about a half liter of retarded slurry was ground in a small porcelain mill for one hour at ball charge of 45% by volume. After grinding, the particle size was measured and the combined water was continuously monitored. A portion of retarded slurry was dried in the oven and dried sample was ground to pass 150 mesh. This sample is called retarded powder.

Figure 3:
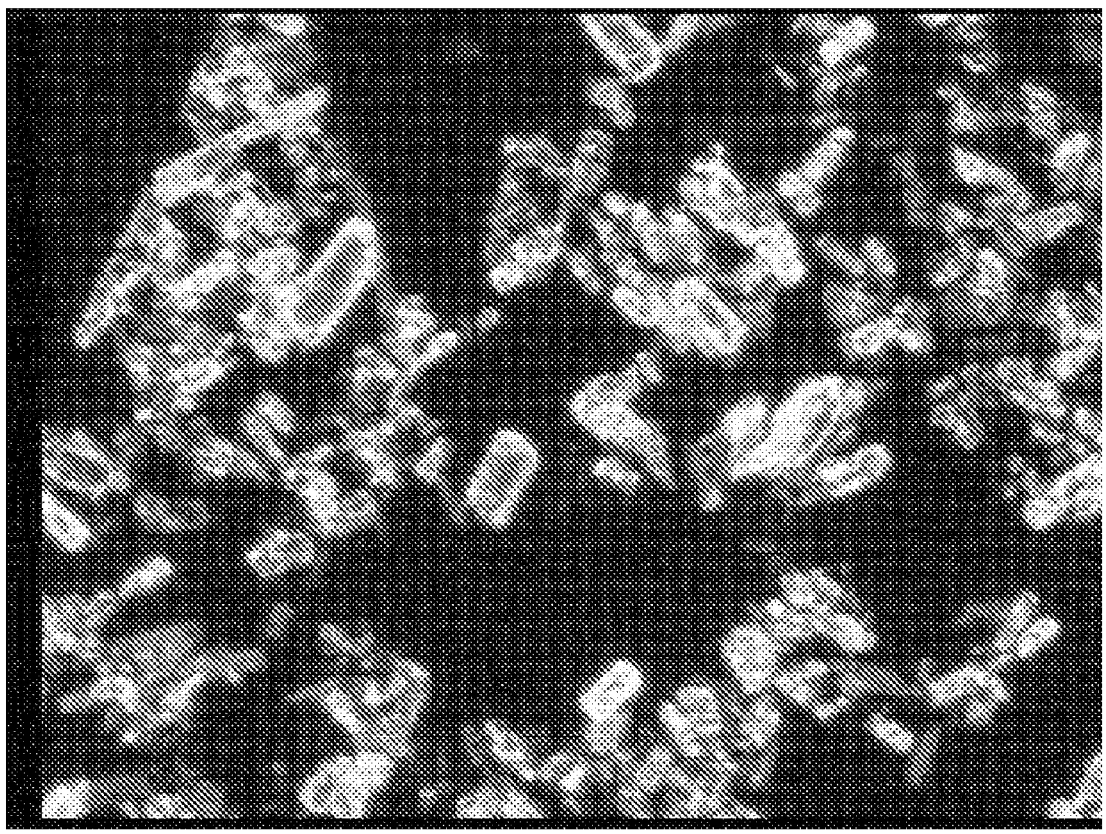
FIG. 3 shows a ×400 magnification photograph of crystal morphology of alpha-hemihydrate retarded using TSPP at 1 wt %.

FIG. 3 shows the crystal morphology of retarded slurry made from the CHEMINEER reactor using TSPP (1 wt. %). The morphology of the particles is typical of $\alpha$-hemihydrates under an optical microscope.

Figure 4:
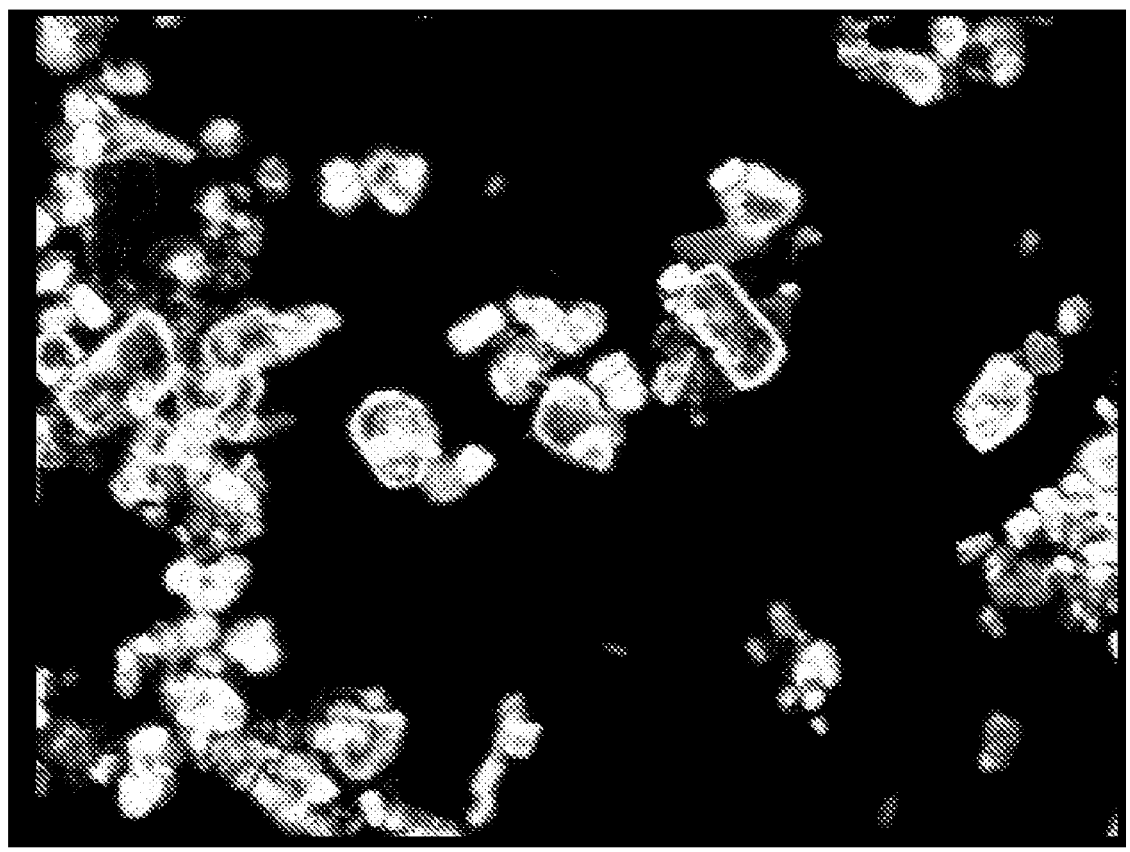
FIG. 4 shows a ×400 magnification photograph of crystal morphology of alpha-hemihydrate retarded using 4:1 TSPP and Citric Acid at 1 wt %.

FIG. 4 shows the crystal morphology of retarded hemihydrate made from the CHEMINEER reactor using TSPP:Citric acid at a 4:1 molar ratio (to have 1 wt. % total TSPP and Citric acid). The retarded hemihydrate contained 6.3% combined water in crystal.

X-ray diffraction analysis indicated that the crystals prepared were alpha-hemihydrate with a limited crystallinity. The average particle size was about 52 µm as determined using a MICROTRAC particle size analyzer.

Figure 5:
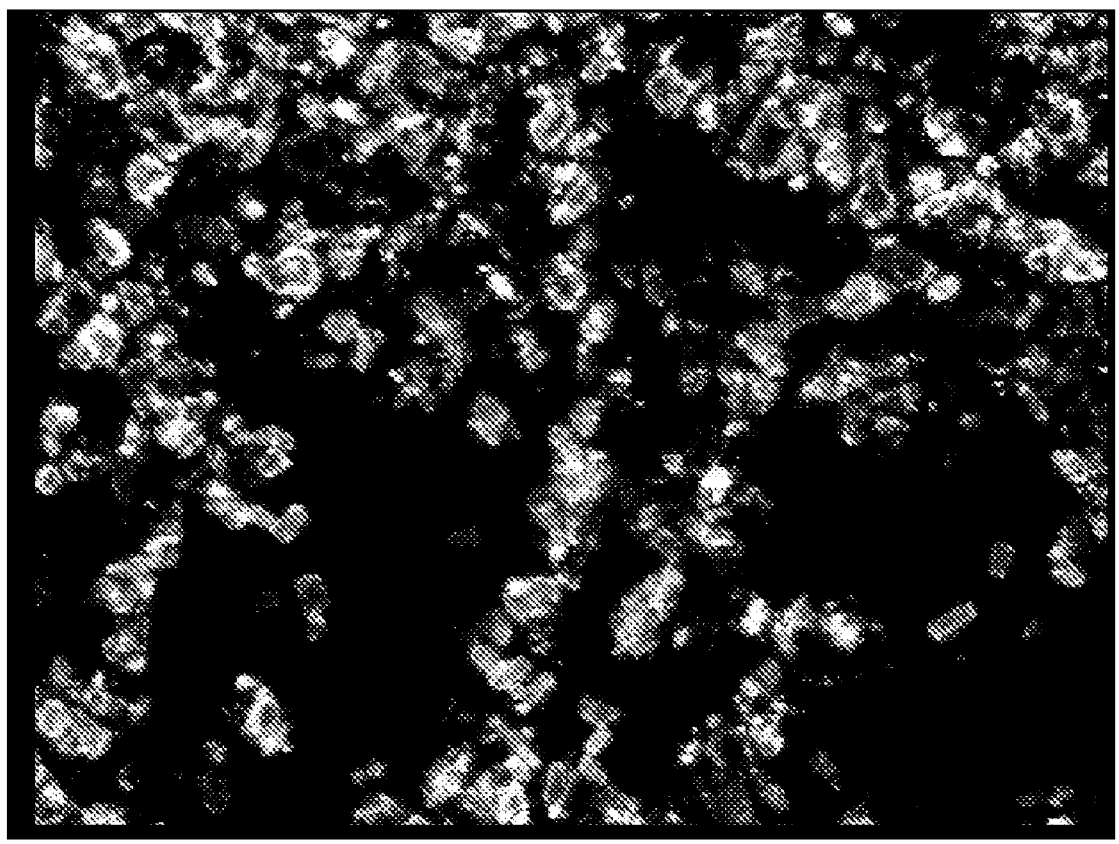
FIG. 5 shows a ×400 magnification photograph of crystal morphology of alpha-hemihydrate retarded with TSPP:Citric acid at 1 wt % after one hour wet-grinding.

FIG. 5 shows the crystal morphology of the retarded alpha-hemihydrate after one-hour wet grinding. The average particle size was reduced from 52 µm to 22 µm after one-hour wet grinding. The combined water remained 6.3 wt % after wet grinding suggesting that the retarded alpha-hemihydrate did not hydrate. Reground slurry has not set for three months. However, further fine grinding in a laboratory rotary mill for additional half hour reduced the average particle size from 22 µm to 5 µm. This caused the fine ground slurry to set within three hours.

Figure 6:
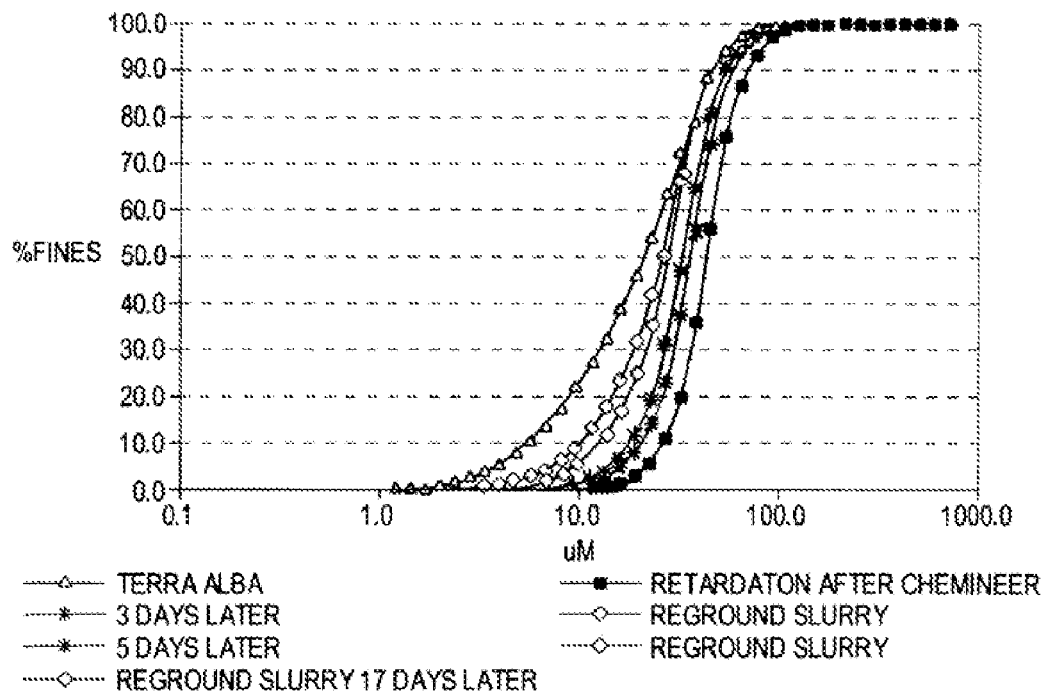
FIG. 6 shows particle size distribution of retarded slurry before and after wet-grinding.

FIG. 6 shows the particle size distribution of retarded slurry before and after regrinding. After one-hour regrinding the average particle size reduced from 52 µm to 22 µm. No significant change in particle size of re-ground slurry was observed after seventeen days. It can be seen that land plaster used for making alpha-hemihydrate was finer than that of alpha-hemihydrate crystals (20 µm vs. 52 µm).

Figure 7:
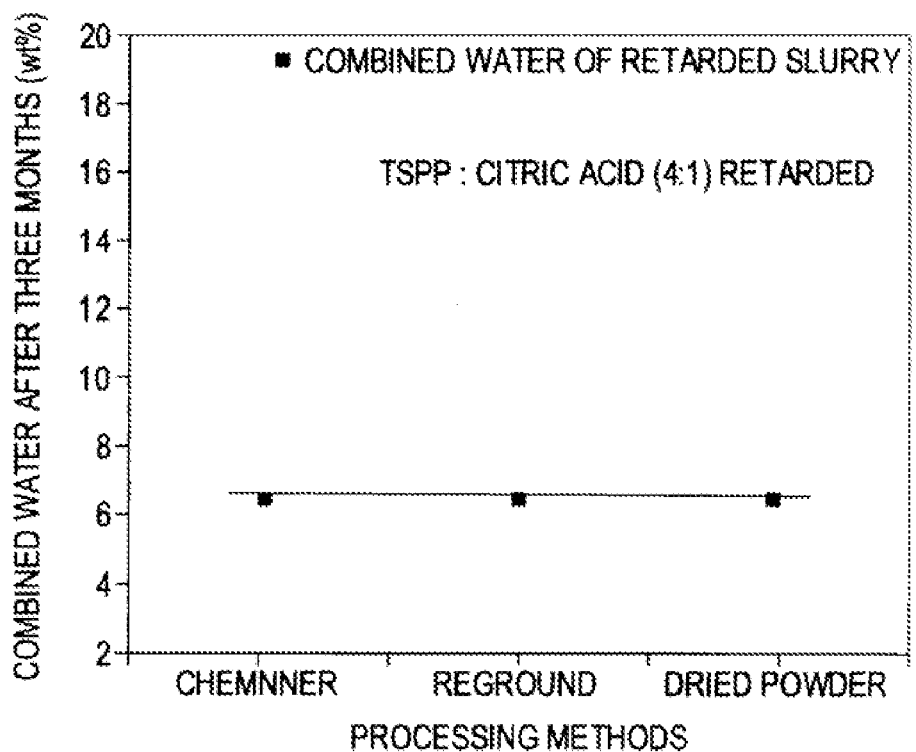
FIG. 7 shows the stability of retarded alpha-hemihydrate prepared by different processing methods.

FIG. 7 showed the combined water of retarded slurry before and after wet grinding. The combined water was determined at various time periods to monitor the stability of the retarded slurry. The combined water has not changed after three months (6.3%) indicating that the slurry is stable (i.e. did not convert to dihydrate). The dried powder prepared from retarded slurry right after the CHEMINEER reactor was also stable as shown from the same test.

Previous studies on adsorption of TSPP and citric acid on alpha-hemihydrate indicated that most TSPP and citric acid adsorbed on the surface of crystals of alpha-hemihydrate. Theoretical calculation suggested that about ninety percent of the crystal surface is to be covered by TSPP and citric acid to obtain complete retardation. As crystal size became finer after wet grinding, the specific surface area of the material increased. Thus, a greater amount of retarders was needed to cover a sufficient amount of the freshly generated crystal facets of alpha-hemihydrate to achieve complete retardation. In the case of fine grinding to 5 µm by a rotary mill, the specific surface area is much higher. Therefore, at the same retarder dosage, the new crystal facets of alpha-hemihydrate generated during wet grinding could not be covered by TSPP and citric acid. This may explain the setting phenomenon observed after rotary mill grinding. The setting of reground alpha-hemihydrate could be avoided either by eliminating over-grinding or by adding more retarders.

The settling of large crystals of the alpha-hemihydrate prepared right after reactor was observed. This resulted in bleed water of the alpha-hemihydrate in the bucket. This is due to a lower solid content of retarded slurry collected after the CHEMINEER reactor (about 48 wt % solids). The lower the solid content, the less the viscosity of the slurry, and the earlier the water bleeding. There is not enough hindrance to keep large crystals suspended in slurry. Adding a thickener to the retarded slurry should result in more stable ready-to-set slurries.

The above data indicates the alpha-hemihydrate was completely retarded by adding 1 wt % of TSPP and citric acid to hot slurry collected right after the reactor. The average particle size of retarded alpha-hemihydrate was reduced from 52 μm to 22 μm after wet grinding in a ball mill for one hour. The reground slurry has not set for three months. Further fine grinding in a rotary mill for half hour reduced the average particle size from 22 μm to 5 μm. This fine grinding resulted in a setting of retarded slurry within three hours. Also, retarded slurry was filtered and dried in an oven at 110° F. for obtaining a powder of alpha-hemihydrate. Slurry prepared using this powder of alpha-hemihydrate also has not set for three months.

Example 2

Figure 8:
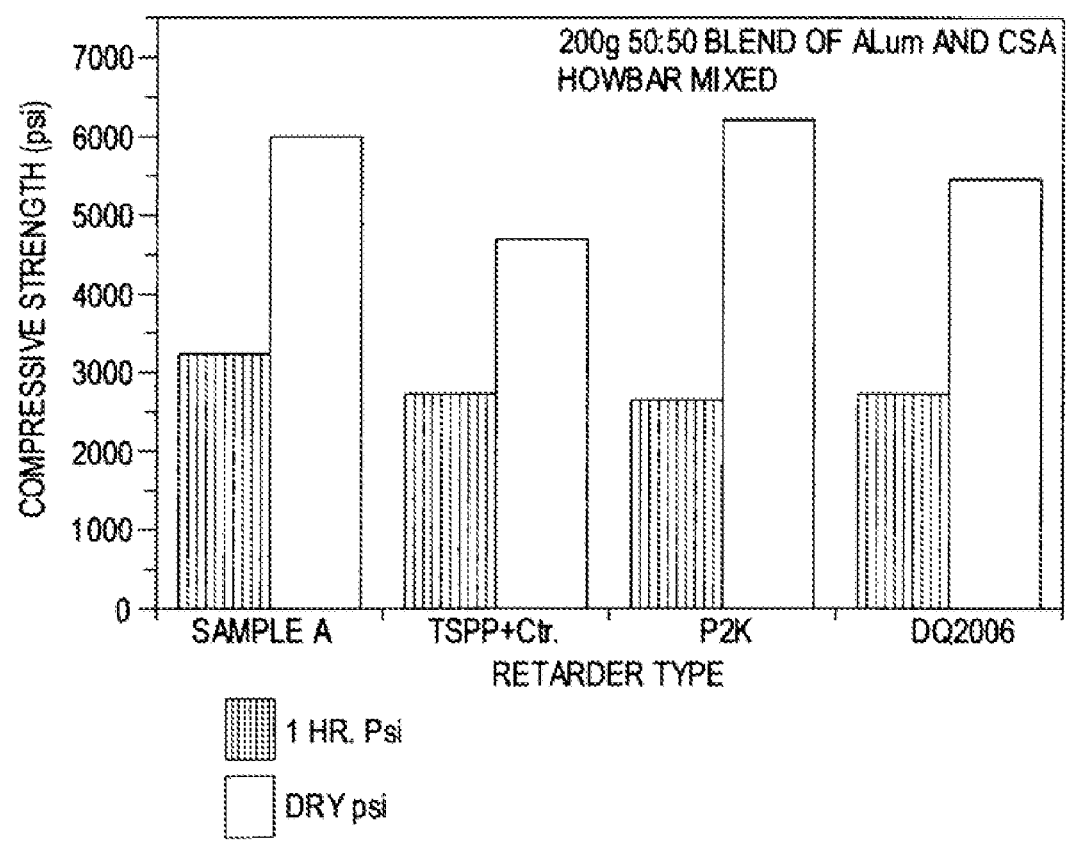
FIG. 8 shows the effects of different retarders on acceleration and compressive strength.

Batches of two gallons of slurry were made to have 1 wt. % of various retarders. FIG. 8 shows the effects of these different retarders on acceleration and compressive strength. It compares regular set calcium sulfate alpha-hemihydrate and water ("Sample A") to retarded slurry accelerated by one or more accelerators, such as aluminum and CSA. Retarded slurry can be accelerated to set with almost the same compressive strength as regular set Sample A which has no retarder or accelerator.

In FIG. 8 all the examples have 1 wt. % retarder. TSPP+Ctr. is 1 wt. % TSPP and citric acid; P2K is polyacrylic acid at a weight average molecular weight of 2100; and DQ2006 is DEQUEST 2006 penta-sodium salt of amino trimethylene phosphonic acid. For each batch, the retarder and 200 grams of accelerator was added to 20,000 grams of slurry except for Sample A which has no retarder or accelerator.

All percentages herein are by weight percent (wt. %) unless otherwise indicated.

Although we have described the preferred embodiments for implementing our invention, it will be understood by those skilled in the art to whom this disclosure is directed that modifications and additions may be made to our invention without departing from the spirit and scope thereof.

We claim:
1. A process of manufacturing a stable product comprising α-calcium sulfate hemihydrate consisting essentially of the steps of:
   mixing calcium sulfate dihydrate, water and at least one first crystal modifier, to control particle morphology, to form a mixture, the at least one first crystal modifier selected from at least one member of the group consisting of maleic acid, succinic acid, lactic acid, citric acid, tartaric acid, monosodium gluconate, ethylene diamine tetra-acetic acid or sodium salt thereof, and aspartic acid;
   calcining the mixture in a reactor at conditions sufficient to form a calcined slurry comprising water and alpha-calcium sulfate hemihydrate;
   adding to the calcined slurry at least one second crystal modifier as a set preventer or set retarder, when the calcination is essentially complete and the slurry contains at least a majority of the water from the reactor, to form the stable product, the at least one second crystal modifier selected from at least one member of the group consisting of citric acid, tartaric acid, polyacrylic acid, aspartic acid; monosodium gluconate, tri-polyphosphate, gelatin, organic polyphosphonic compound, ethylene diamine tetra-acetic acid or sodium salt thereof, diethylene triamine penta-acetic acid, tetra-sodium pyrophosphate, and sodium polyacrylate,
   wherein the stable product is a ready-mixed slurry composition comprising the calcined slurry and the at least one second crystal modifier as the set preventer or set retarder, and
   packaging the stable product to produce packages of the stable ready mix slurry product,
   wherein there is an absence of drying before said adding to the calcined slurry at least one second crystal modifier,
   wherein there is an absence of filtering before said adding to the calcined slurry at least one second crystal modifier,
   wherein there is an absence of drying before said packaging, and
   wherein there is an absence of filtering before said packaging.

2. The process of claim 1, wherein the at least one first crystal modifier is added to the calcium sulfate dihydrate and water before said step of calcining.

3. The process of claim 1, wherein the at least one first crystal modifier is mixed with the calcined slurry in the reactor during the step of calcining, but prior to completion of the calcination.

4. The process of claim 1, wherein the at least one second crystal modifier is selected from at least one member of the group consisting of citric acid, tartaric acid, aspartic acid; monosodium gluconate, tri-polyphosphate, gelatin, organic polyphosphonic compound, ethylene diamine tetra-acetic acid or sodium salt thereof, diethylene triamine penta-acetic acid, and tetra-sodium pyrophosphate;
   wherein adding the at least one second crystal modifier to the calcined slurry produces a mixture consisting of said water of the calcined slurry, said alpha-calcium sulfate hemihydrate of the calcined slurry, said at least one first crystal modifier, and said at least one second crystal modifier.

5. The process of claim 1, wherein the at least one second crystal modifier is mixed with the calcined slurry in the reactor.

6. The process of claim 1, wherein the at least one second crystal modifier is mixed with the calcined slurry downstream of the reactor.

7. The process of claim 1, wherein the weight ratio of water to calcined gypsum downstream of the reactor is from about 0.15 to about 0.5, and wherein the composition has a viscosity of from about 5,000 centipoise to about 48,000 centipoise, and said composition forms an interlocking matrix of set gypsum when mixed with an activator for the reaction of calcium sulfate hemihydrate with water to form set gypsum.

8. The process of claim 1, wherein the at least one first crystal modifier comprises succinic acid.

9. The process of claim 1, wherein the at least one first crystal modifier comprises maleic acid.

10. The process of claim 1, wherein the at least one first crystal modifier comprises potassium sulfate.

11. The process of claim 1, wherein the at least one second crystal modifier is selected from the group consisting of tetrasodium pyrophosphate and citric acid.

12. The process of claim 1, wherein the at least one second crystal modifier comprises tetrasodium pyrophosphate.

13. The process of claim 1, wherein the at least one second crystal modifier comprises tetrasodium pyrophosphate and citric acid.

14. The process of claim 1, wherein the at least one second crystal modifier comprises tetrasodium pyrophosphate and citric acid in a ratio of tetrasodium pyrophosphate to citric acid is 4:1.

15. The process of claim 1, wherein the stable product has a shelf life of at least 12 months, wherein the at least one second crystal modifier is selected from at least one member of the group consisting of citric acid, tartaric acid, aspartic acid; monosodium gluconate, tri-polyphosphate, gelatin, organic polyphosphonic compound, ethylene diamine tetra-acetic acid or sodium salt thereof, diethylene triamine penta-acetic acid, and tetra-sodium pyrophosphate;

wherein adding the at least one second crystal modifier to the calcined slurry produces a mixture consisting of said water of the calcined slurry, said alpha-calcium sulfate hemihydrate of the calcined slurry, said at least one first crystal modifier, and said at least one second crystal modifier.

16. The process of claim 1, further including adding an accelerator to the stable product to form a setting slurry product.

17. The process of claim 16, wherein the setting slurry product is flowable for at least 0.25 hours after being mixed with an activator.

18. The process of claim 1, wherein said at least one first crystal modifier comprises a first amount of citric acid and said at least one second crystal modifier comprises a second amount of citric acid.

19. The process of claim 1, wherein the stable product comprises water and calcined gypsum in a weight ratio from about 0.15 to about 0.5, the water being substantially the water added to the mixture prior to calcining;

heat supplied for calcining by delivering steam to a jacket around the reactor in which the slurry is located during calcining.

* * * * *